United States Patent [19]
Hanaoka et al.

[11] Patent Number: 5,283,674
[45] Date of Patent: Feb. 1, 1994

[54] BACKLIGHT APPARATUS HAVING VENTILATING HOLES FOR LIQUID CRYSTAL DISPLAY

[75] Inventors: Shunsuke Hanaoka, Tokyo; Arifumi Etoh; Heihachi Ide, both of Kanagawa, all of Japan

[73] Assignee: Sony Corporation, Tokyo, Japan

[21] Appl. No.: 954,340

[22] Filed: Sep. 30, 1992

[30] Foreign Application Priority Data

Sep. 30, 1991 [JP] Japan .................................. 3-278855

[51] Int. Cl.⁵ .......................... G02F 1/133; F21S 3/00
[52] U.S. Cl. ........................................ 359/49; 359/50; 362/218
[58] Field of Search .............................. 359/48, 49, 50; 362/217, 218, 294, 296, 297

[56] References Cited

FOREIGN PATENT DOCUMENTS

| | | | |
|---|---|---|---|
| 0420072 | 4/1991 | European Pat. Off. ............. | 359/50 |
| 0155829 | 9/1984 | Japan .................................. | 359/50 |
| 0000515 | 1/1989 | Japan .................................. | 359/49 |
| 0208631 | 8/1990 | Japan .................................. | 359/50 |

Primary Examiner—William L. Sikes
Assistant Examiner—Huy Mai
Attorney, Agent, or Firm—Hill, Steadman & Simpson

[57] ABSTRACT

A liquid crystal display apparatus which prevents illumination of light by non-uniform brightness from a fluorescent lamp employed for the backlight illumination which is caused by mercury enclosed in the fluorescent tube being deposited on the inner surface of the tube of the fluorescent lamp. The liquid crystal display apparatus comprises a liquid crystal display panel, a backlight apparatus including a fluorescent lamp disposed on the rear face side of the liquid crystal display panel for directing illuminating backlight upon the liquid crystal display panel, and a reflecting plate disposed remote from the liquid crystal display panel with respect to the fluorescent lamp. The reflecting plate has a plurality of ventilating holes formed at portions of a recessed portion thereof opposing to an outer periphery of the fluorescent lamp.

4 Claims, 2 Drawing Sheets

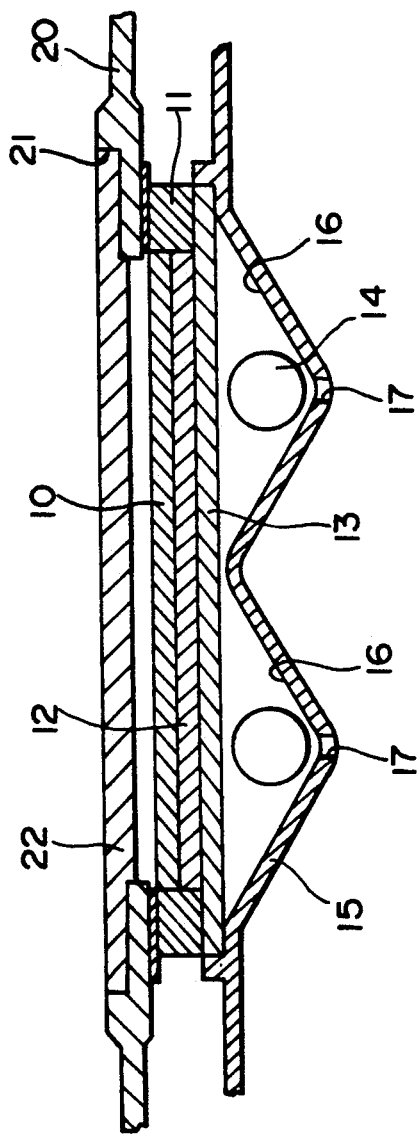

BACKLIGHT APPARATUS HAVING VENTILATING HOLES FOR LIQUID CRYSTAL DISPLAY

BACKGROUND OF THE INVENTION

1. Field of the Invention

This invention relates to a display apparatus having a liquid crystal display panel, and more particularly to a liquid crystal display apparatus wherein a backlight apparatus in the form of a fluorescent lamp is disposed on the back face side of a liquid crystal panel so that the liquid crystal panel is illuminated by the backlight apparatus.

2. Description of the Prior Art

A display apparatus which makes use of a liquid crystal display panel is advantageous in that a television receiver can be constructed with a reduced thickness comparing with another television receiver which makes use of a CRT (cathode ray tube). Due to the advantage, television receivers making use of a liquid crystal display panel have been put into practical use. When a television receiver of the type including a liquid crystal display panel is constructed as a television receiver of the reflecting type, there is a drawback that it is so low in brightness that an image thereon cannot be observed clearly. Therefore, a display apparatus has been proposed wherein a backlight apparatus in the form of a fluorescent lamp is disposed on the rear face side of a liquid crystal panel and backlight from the backlight apparatus is distributed uniformly by a diffusing plate so that it may illuminate the liquid crystal display panel uniformly.

A display apparatus of the type wherein a fluorescent lamp is employed as a backlight apparatus, however, has a drawback that, as time passes, drops of mercury are deposited on the inner surface of the tube thereof and make the brightness thereof non-uniform. In particular, there is a drawback that mercury enclosed in the fluorescent lamp is condensed and deposited and locally stricks to the inner surface of the tube of the fluorescent lamp and decreases the brightness at the portions of the tube at which the mercury sticks. While the brightness of the tube is made more uniform to some degree by the diffusing plate, if the amount of mercury sticking to the tube increases, then the illumination upon the liquid crystal display panel becomes non-uniform.

SUMMARY OF THE INVENTION

It is an object of the present invention to provide uniform backlight illumination of a liquid crystal display apparatus, any non-uniform brightness from a fluorescent lamp employed for the backlight illumination which is caused by mercury enclosed in the fluorescent tube being deposited on the inner surface of the tube of the fluorescent lamp being prevented thereby.

In order to attain the object, according to the present invention, there is provided a liquid crystal display apparatus, which comprises a liquid crystal display panel, a backlight apparatus including a fluorescent lamp disposed on the rear face side of the liquid crystal display panel for providing backlight illumination for the liquid crystal display panel, and a reflecting plate disposed remote from the liquid crystal display panel with respect to the fluorescent lamp and having a plurality of ventilating holes formed at portions thereof that are opposite an outer periphery of the fluorescent lamp.

In the liquid crystal display apparatus, the liquid crystal display panel is illuminated by light from the fluorescent lamp emitted directly upon the the rear face side of the panel, and also by light emitted from the fluorescent lamp and reflected by the reflecting plate onto the rear face side. Further, the fluorescent lamp is locally cooled by ventilating air admitted through the ventilating holes formed in the reflecting plate, and consequently, the mercury enclosed in the fluorescent lamp will be deposited in a concentrated manner at portions of the fluorescent lamp which are cooled by the ventilating air through the ventilating holes. Since the portions of the fluorescent lamp at which the mercury is deposited in a concentrated manner are remote from the liquid crystal display panel, the influence of the thus deposited mercury upon uniform brightness of light at the liquid crystal display panel is minimized. Further, while it is a problem of a conventional liquid crystal display apparatus that, if the fluorescent lamp is located in the proximity of the reflecting plate, then the temperature at a portion of the fluorescent lamp adjacent the reflecting plate is raised and sticking of the mercury takes place at an opposite side portion of the fluorescent lamp adjacent the liquid crystal display panel, which is an obstacle to reduction in overall thickness of the backlight apparatus, with the liquid crystal display apparatus of the present invention, since the portions of the fluorescent lamp to which mercury sticks are concentrated upon the rear side face of the fluorescent lamp remote from the face directed towards the liquid crystal display panel even if the fluorescent lamp is located in the proximity of the reflecting plate, the backlight apparatus can be produced with a reduced thickness, and accordingly, reduction in overall thickness of the liquid crystal display apparatus can be achieved.

Preferably, the ventilating holes have a width considerably smaller than the diameter of the fluorescent lamp. Thus, any decrease in the reflected light from the reflecting plate caused by provision of the ventilating holes can be reduced to a degree sufficient to ignore the same.

Preferably, the reflecting plate has a recessed portion formed thereon in which the fluorescent lamp is accommodated, and the ventilating holes are formed at the bottom of the recessed portion of the reflecting plate. Thus, since the fluorescent lamp is cooled at the portions thereof facing the ventilating holes at the bottom of the recessed portion, the mercury will be deposited in a concentrated manner at the portions of the inner surface of the fluorescent lamp facing the ventilating holes of the bottom of the recessed portion.

Preferably, the fluorescent lamp has a generally U-shaped profile, and the ventilating holes are formed successively along the U-shape of the fluorescent lamp.

The above and other objects, features and advantages of the present invention will become apparent from the following description and the appended claims, taken in conjunction with the accompanying drawings in which like parts or elements are denoted by like reference characters.

BRIEF DESCRIPTION OF THE DRAWINGS

FIG. 2 is a partial sectional view of the liquid crystal display apparatus of FIG. 1.

DETAILED DESCRIPTION OF THE PREFERRED EMBODIMENT

Figure 1:
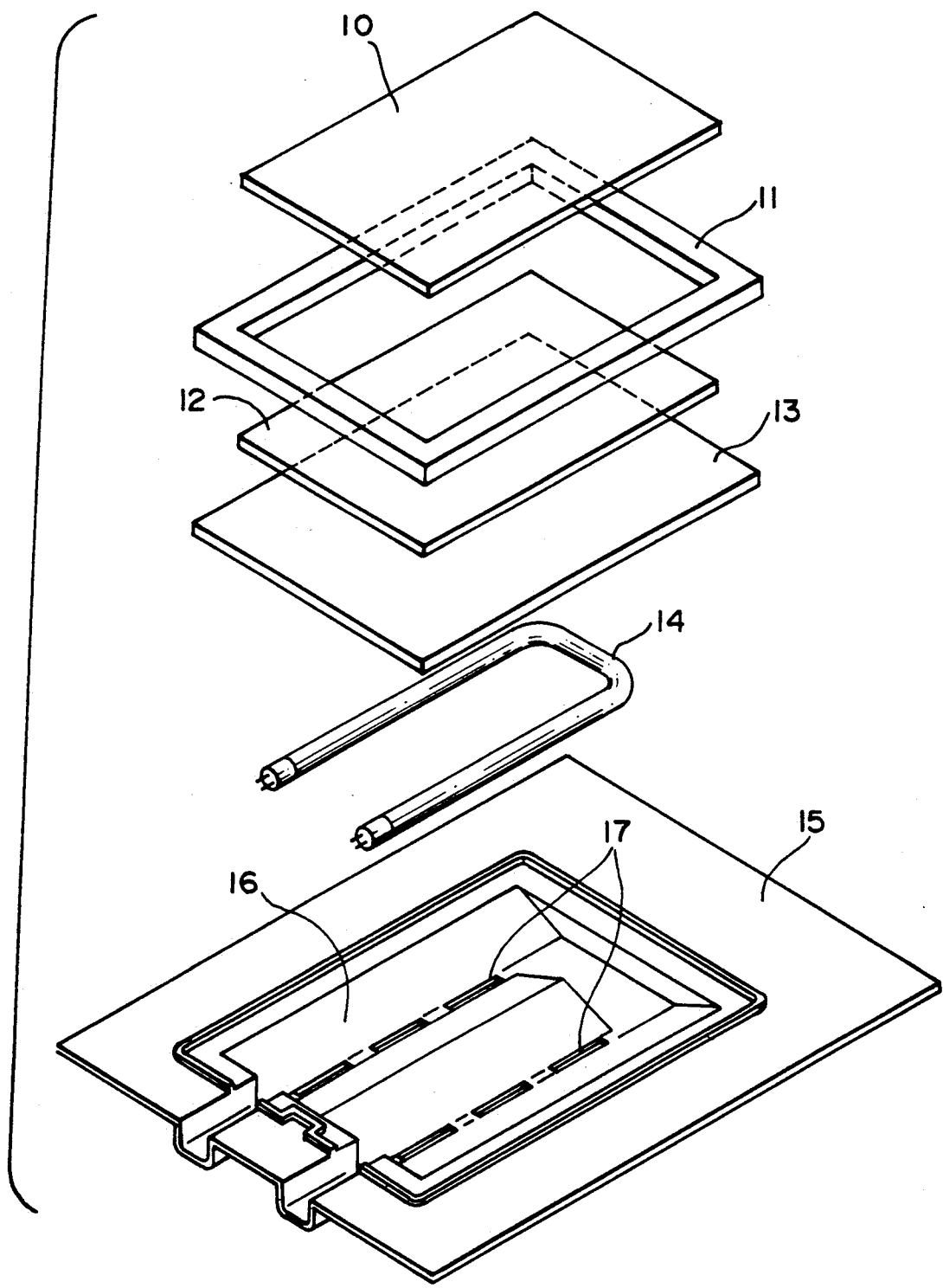
FIG. 1 is a exploded perspective view of a liquid crystal display apparatus of a preferred embodiment of the present invention.

Referring first fo FIG. 1, there is shown a liquid crystal display apparatus to which the principles of the present invention is applied. The liquid crystal display apparatus shown includes a liquid display panel 10 held in the inner side of a rectangular frame member 11. A diffusing plate 12 is disposed in registration with the liquid crystal display panel 10 and held on the frame member 11 below the liquid crystal display panel 10. A lighting curtain 13 is disposed below the diffusing plate 12 and provides preliminary diffusion of light.

A generally U-shaped fluorescent lamp 14 is disposed below the lighting curtain 13. The fluorescent lamp 14 is held in a recessed portion 16 of the reflecting plate 15 disposed therebelow. A plurality of ventilating holes 17 having a smaller width than the diameter of the fluorescent lamp 14 are formed in the bottom of the recessed portion 16 of the reflecting plate 15.

Referring now to FIG. 2, the liquid crystal display apparatus is adapted to be mounted in a window 21 of a cabinet 20 of, for example, a television receiver. The window 21 is in the form in a rectangular opening formed at a predetermined position of the cabinet 20 and is covered with a transparent plate 22. The liquid crystal display apparatus including the liquid crystal panel 10 is disposed on the inner side of or below the transparent plate 22.

Light emitted from the fluorescent lamp 14 is transmitted directly or indirectly after reflection by the reflecting plate 15 to and is diffused by the lighting curtain 13 and the diffusing plate 12 so that it illuminates the liquid display panel 10 from the inner or lower side. Accordingly, an image displayed by the display panel 10 is illuminated by the backlight so that a bright image can be visually observed by the user.

The present backlight apparatus for a television receiver has the liquid crystal display panel 10 and the fluorescent lamp 14 is disposed below the liquid display panel 10 so that light from the fluorescent lamp 14 is reflected to the liquid crystal display panel 10 back side by the reflecting plate 15. In addition, the reflecting plate 15 has the small ventilating holes 17 formed at the recessed portion 16 thereof. The small holes 17 are positioned just below the fluorescent lamp 14.

The fluorescent lamp 14 is thus partially cooled by ventilating air admitted through the ventilating holes 17, and consequently, any mercury deposits on the inner surface of the tube of the fluorescent lamp 14 are concentrated at a portion of the tube opposite the side which faces the liquid crystal display panel 10. Furthermore, since the ventilating holes 17 are provided just below the fluorescent lamp 14 in the vertical direction and since the have a smaller width than the diameter of the fluorescent lamp 14, the decrease of reflected light from the reflecting plate 15 due to provision of the ventilating holes 17 is sufficiently small to ignore the same.

With the liquid crystal display apparatus of the embodiment described above, since the ventilating holes 17 are provided at the recessed portion 16 of the reflecting plate 15, the fluorescent lamp 14 can be cooled locally so that portions thereof at which mercury is liable to be deposited, that is, portions thereof at which the temperature is comparatively low, can be restricted intentionally. Then, since the portions of the fluorescent lamp 14 at which mercury is liable to be deposited are positioned on the rear side of the fluorescent lamp 14, any non-uniformity in the brightness of light upon the liquid crystal display panel 10 can be minimized. Further, if the fluorescent lamp 14 is located in the proximity of the reflecting plate 15 without the use of the ventilating holes, then the temperature at a portion of the fluorescent lamp 14 adjacent the reflecting plate 10 is raised, resulting in the problem that deposition of mercury takes place at an opposite side portion of the fluorescent lamp 14 adjacent the liquid crystal display panel 10. However, since the portions of the fluorescent lamp 14 at which mercury is deposited can be concentrated upon the rear side face of the fluorescent lamp 14 remote from the face thereof opposing to the liquid crystal display panel 10 by forming the ventilating holes 17 in the reflecting plate 15, the fluorescent lamp 14 can be located in the proximity of the reflecting plate 15. Consequently, the backlight apparatus can be produced with a reduced thickness, and accordingly, the liquid crystal display apparatus can be assembled to a compact configuration.

Having now fully described the invention, it will be apparent to one of ordinary skill in the art that many changes and modifications can be made thereto without departing from the spirit and scope of the invention as set forth herein.

What is claimed is:

1. A liquid crystal display apparatus comprising:
   a liquid crystal display panel;
   a backlight apparatus including a fluorescent lamp disposed on the rear face side of said liquid crystal display panel for illuminating backlight therefrom upon said liquid crystal display panel; and
   a reflecting plate disposed remote from said liquid crystal display panel with respect to said fluorescent lamp and having a plurality of ventilating holes formed at portions thereof opposing to an outer periphery of said fluorescent lamp, said plurality of ventilating holes being of a width less than a diameter of said fluorescent lamp to restrict deposits inside said fluorescent lamp to an area less than a diameter of said fluorescent lamp.

2. A liquid crystal display apparatus according to claim 1, wherein said width is considerably smaller than the diameter of said fluorescent lamp and said ventilation holes are of a length less than a length of said fluorescent lamp.

3. A liquid crystal display apparatus according to claim 1, wherein said reflecting plate has a recessed portion formed thereon in which said fluorescent lamp is accommodated, and said ventilating holes are formed at the bottom of said recessed portion of said reflecting plate.

4. A liquid crystal display apparatus according to claim 1, wherein said fluorescent lamp has a generally U-shaped profile, and said ventilating holes are formed successively along the U-shape of said fluorescent lamp.

* * * * *